United States Patent [19]

Blackburn et al.

[11] Patent Number: 5,538,099
[45] Date of Patent: Jul. 23, 1996

[54] METHOD AND APPARATUS FOR CONTROLLING AN AIR BAG RESTRAINT SYSTEM

[75] Inventors: Brian K. Blackburn, Rochester; Scott B. Gentry, Romeo; Joseph F. Mazur, Washington, all of Mich.; Naushad Hossain, Los Angeles; James G. McCuskey, Lakewood, both of Calif.

[73] Assignees: TRW Vehicle Safety Systems Inc., Lyndhurst, Ohio; TRW Technar Inc., Irwindale, Calif.

[21] Appl. No.: 250,361

[22] Filed: May 27, 1994

[51] Int. Cl.⁶ .............................. B60R 21/22; B60R 21/32
[52] U.S. Cl. ..................... 180/282; 180/286; 280/730.2; 280/735; 307/10.1
[58] Field of Search ................. 280/730 A, 730 R, 280/735, 734, 728 R, 803, 730.2, 730.1, 728.1; 180/286, 282, 279, 274, 273; 307/10.1

[56] References Cited

U.S. PATENT DOCUMENTS

| | | | |
|---|---|---|---|
| 3,672,699 | 6/1972 | De Windt | 180/273 |
| 4,007,802 | 2/1977 | de Rosa | 280/803 |
| 4,688,825 | 8/1987 | Arbogast et al. | 180/286 |
| 4,832,365 | 5/1989 | Kawai et al. | 180/286 |
| 5,037,133 | 8/1991 | Kataoka et al. | 280/804 |
| 5,129,673 | 7/1992 | Mattes et al. | 280/735 |
| 5,172,790 | 12/1992 | Ishikawa et al. | 280/735 |
| 5,173,614 | 12/1992 | Woehrl et al. | 280/735 |
| 5,202,831 | 4/1993 | Blackburn et al. | 280/735 |
| 5,224,733 | 7/1993 | Simsic | 280/735 |
| 5,253,173 | 10/1993 | Drobny et al. | 280/735 |
| 5,318,146 | 6/1994 | Witte | 280/735 |
| 5,322,323 | 6/1994 | Ohno et al. | 280/730 A |
| 5,339,242 | 8/1994 | Reid et al. | 280/735 |
| 5,363,302 | 11/1994 | Allen et al. | 280/735 |

FOREIGN PATENT DOCUMENTS

| | | |
|---|---|---|
| 0548849 | 6/1993 | European Pat. Off. . |
| 0616926 | 9/1994 | European Pat. Off. . |
| 2686557 | 7/1993 | France . |

OTHER PUBLICATIONS

Japanese Patent No. JP 5139240, dated Jun. 8, 1993 (abstract only).
Japanese Patent No. JP 6001201, dated Jan. 11, 1994 (abstract only).
Japanese Patent No. JP 6135295, dated May 17, 1994 (abstract only).
Japanese Patent No. JP 6183313, dated Jul. 5, 1994 (abstract only).
A copy of European Search Report dated Sep. 26, 1995.

Primary Examiner—Eric D. Culbreth
Assistant Examiner—Peter C. English
Attorney, Agent, or Firm—Tarolli, Sundheim, Covell, Tummino & Szabo

[57] ABSTRACT

An occupant restraint device (10) for a vehicle includes an air bag (16) mounted in the vehicle door (14) and an accelerometer (30) for measuring sideways acceleration of the door (14). A controller (20) monitors the accelerometer output (34, 36) and determines if the door (14) is in a door opening event or if the vehicle is in a sideways crash condition. The controller (20) actuates the air bag (16) if a vehicle crash condition is detected and disables actuation of the air bag (16) if the vehicle door (14) is determined to be opening.

33 Claims, 9 Drawing Sheets

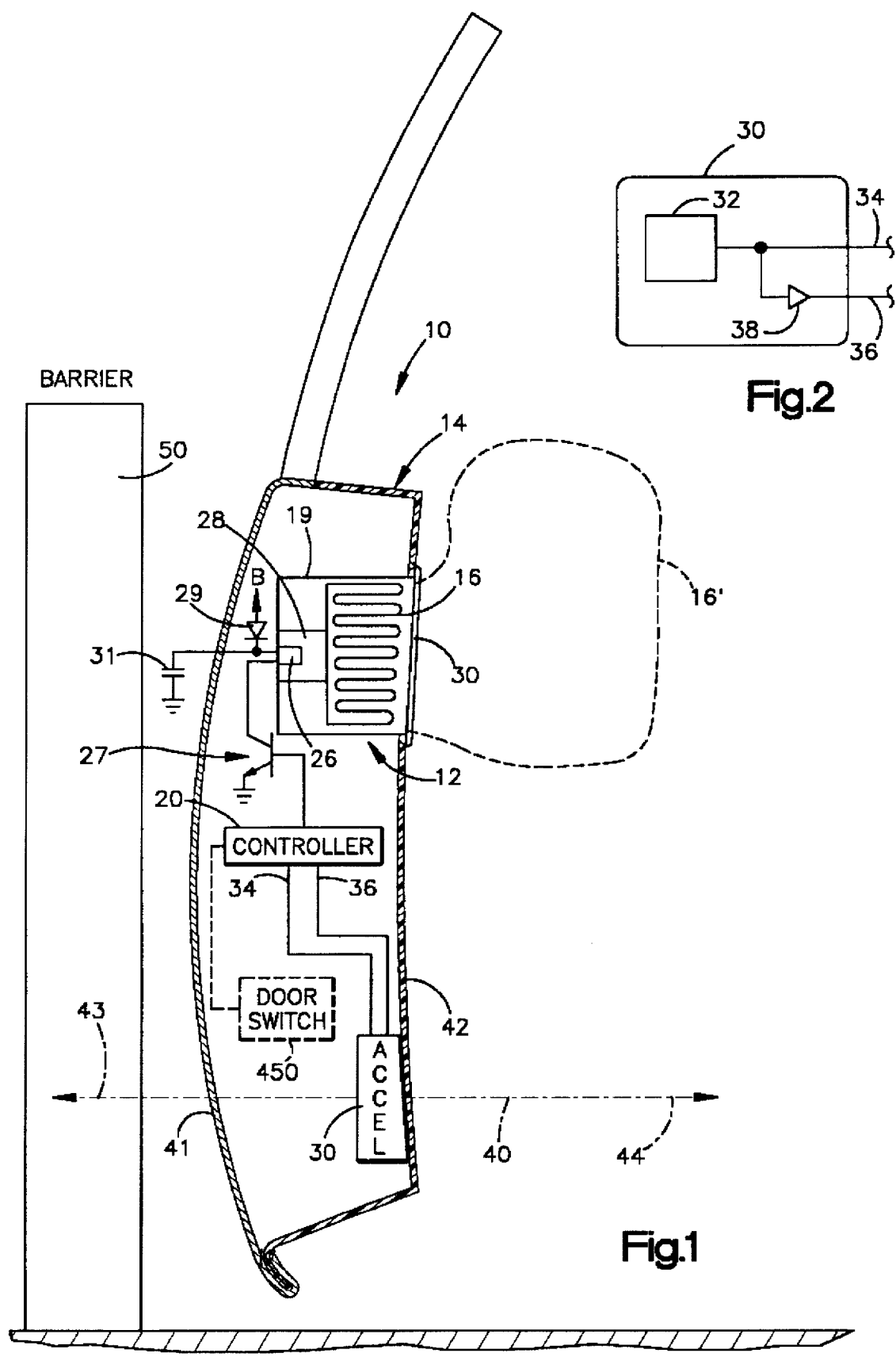

METHOD AND APPARATUS FOR CONTROLLING AN AIR BAG RESTRAINT SYSTEM

TECHNICAL FIELD

The present invention is directed to a vehicle air bag restraint system and is particularly directed to a method and apparatus for controlling an air bag restraint system adapted for side impact protection.

BACKGROUND OF THE INVENTION

Vehicle restraint systems that include an air bag mounted forward of the occupant's seating position are well known in the art. Such forward mounted restraint systems also include either an inertia switch or an accelerometer for sensing the occurrence of a crash condition. When a crash condition of sufficient severity is sensed, the associated forward mounted air bag is deployed.

Side mounted air bag restraint systems including an air bag mounted in the occupant's door are also known in the art. Prior art side mounted air bag restraint systems have included contact switches in the door. A crash into the door of sufficient severity results in actuation of the switch which, in turn, results in actuation of the door mounted air bag.

Some door mounted air bag restraint systems use an accelerometer for sensing a side crash. A controller is connected to the accelerometer. When the controller determines a side crash of sufficient severity is occurring, the associated side air bag is actuated. One example of such a system is disclosed in U.S. Pat. No. 5,202,831 to Blackburn et al.

A particular problem arises when the crash sensing accelerometer is mounted in the door having a door mounted air bag restraint system. This problem relates to the potential for inadvertent deployment of the door mounted air bag when the door is opened into a stationary object. When the opening door strikes the object, the sudden stopping of the door is "seen" by the accelerometer as being the same as a large impact into the door by an external object, i.e., in the same direction as would occur if another vehicle crashed into the door. This sudden stopping of the door could result in an output from the accelerometer that is misinterpreted by the associated controller as being a deployment crash condition and that results in deployment of the air bag by the controller.

SUMMARY OF THE INVENTION

In accordance with the present invention, a method and apparatus are provided for controlling actuation of an air bag and preventing inadvertent deployment of the air bag should the door be opened into a barrier.

In accordance with one embodiment of the present invention, an apparatus is provided for preventing inadvertent actuation of an occupant restraint. The apparatus includes sensing means for sensing opening of a vehicle door and providing a signal indicative thereof, and control means operatively connected to the sensing means and to the occupant restraint for preventing actuation of the occupant restraint when the signal from the sensing means indicates the vehicle door is open.

In accordance with another aspect of the present invention, an apparatus includes an air bag mounted in a vehicle door, and crash sensing means mounted in the door for providing a signal indicative of door acceleration. The apparatus further includes means for, when energized, actuating the air bag restraint. Control means is connected to the actuating means and to the crash sensing means for controlling the actuating means to actuate the air bag restraint when the signal from the crash sensing means is indicative of a vehicle crash condition. The control means further includes means for preventing inadvertent energization of the actuating means in response to an output signal from the crash sensing means indicative of a door opening condition. The crash sensing means includes an accelerometer mounted in the door. The control means monitors the output of the accelerometer and determines door velocity. The controller determines a door opening condition is occurring if the value of the acceleration signal is between first and second acceleration threshold values and the determined velocity is between first and second velocity threshold values. The apparatus preferably includes timing means for timing out a predetermined time period after a door opening condition is determined. The means for preventing energization of the actuating means is responsive to the timing means so that actuation prevention is effective when the timing means is timing out the predetermined time period. Actuation of the air bag is controlled in response to the average acceleration value being greater than an average acceleration threshold value and in response to a determined crash velocity value being greater than a crash velocity threshold value. In one embodiment, the energization preventing means completely prevents actuation while the timing means is timing out the predetermined time period. In accordance with another embodiment, the crash velocity threshold value used for comparing against the determined crash velocity value is increased during the predetermined time period.

In accordance with another aspect of the present invention, a method is provided for preventing actuation of an occupant restraint comprising the steps of sensing opening of a vehicle door and providing a signal indicative thereof, and preventing actuation of the occupant restraint when the signal from the sensing means indicates the vehicle door is open.

In accordance with yet another aspect of the present invention, a method is provided for controlling an air bag restraint including an air bag mounted in a vehicle door, including the step of providing a signal indicative of sideways acceleration of the vehicle door. The method further includes the steps of determining door velocity from the acceleration signal and preventing actuation of the air bag when the acceleration signal and determined velocity of the door are indicative of the vehicle door being opened. The method preferably includes indicating a door open condition if the value of the acceleration signal is between first and second threshold values and the velocity determined from the acceleration signal is between first and second velocity threshold values. The method further includes timing out a predetermined time period after a door open condition is determined and preventing inadvertent energization of the actuating means in response to the timing means so that inadvertent actuation is prevented when the timing means is timing out the predetermined time period. Actuation of the air bag is controlled in response to the average acceleration value being greater than an average acceleration threshold value and in response to a determined velocity value being greater than a velocity threshold value. In one embodiment, deployment of the air bag is completely prevented during the time period. In accordance with another embodiment, the crash velocity threshold value used for comparing against the determined crash velocity value is increased during the time period.

BRIEF DESCRIPTION OF THE DRAWINGS

The foregoing and other features of the present invention will become apparent to those skilled in the art to which the present invention relates upon consideration of the following description of the invention with reference to the accompanying drawings, wherein:

FIG. 1 illustrates a door mounted restraint system made in accordance with the present invention;

FIG. 2 is a detailed illustration of the acceleration sensor assembly shown in FIG. 1;

DESCRIPTION OF PREFERRED EMBODIMENT

Figure 3:
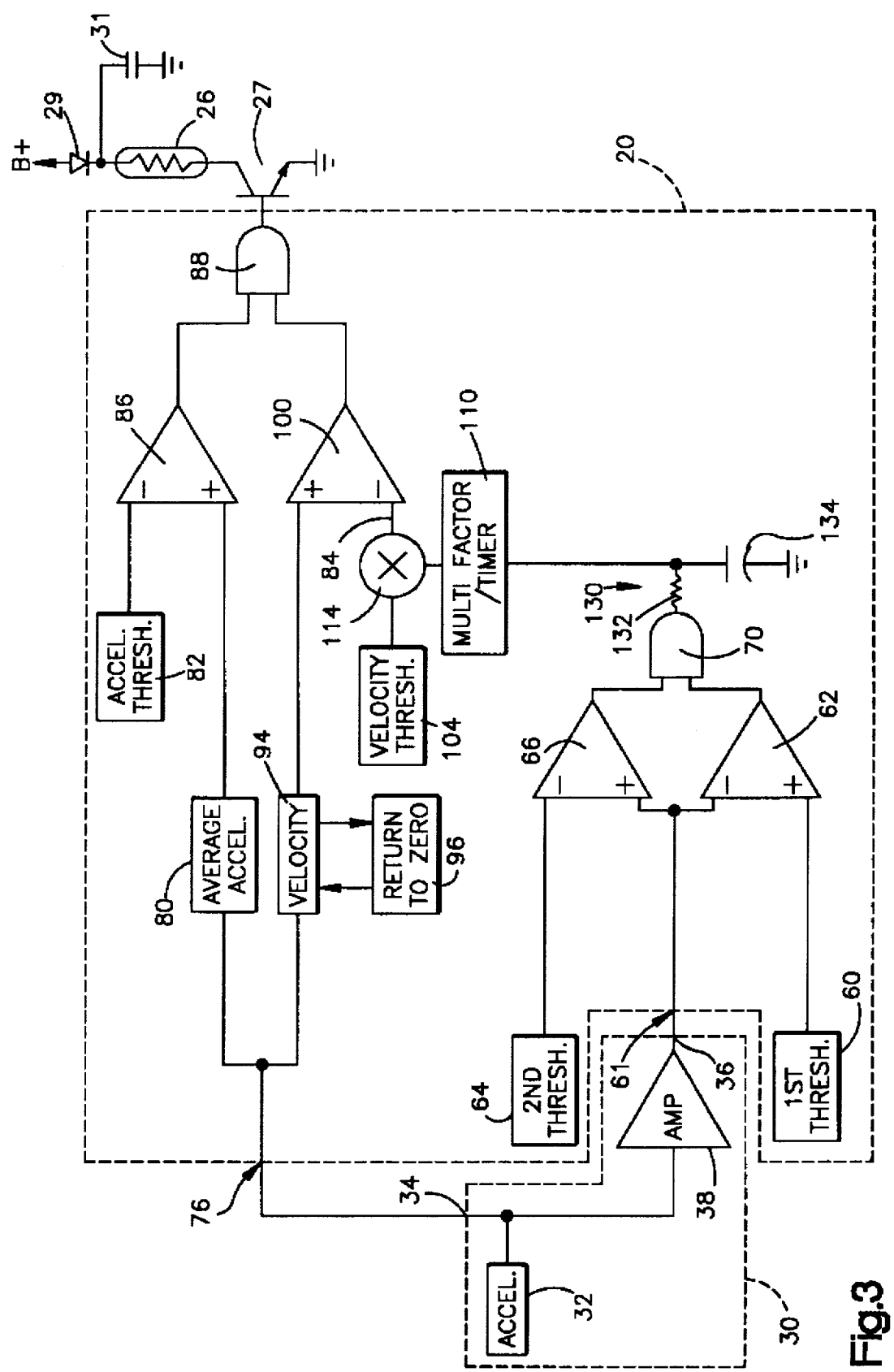
FIG. 3 is a schematic block diagram illustrating processing functions performed by the controller of FIG. 1.

Referring to FIG. 1, a door mounted air bag restraint system 10, made in accordance with the present invention, includes an air bag assembly 12 mounted in a door assembly 14. For the purpose of explanation, the restraint system of the present invention is described with reference to the driver's door. It is to be understood that the present invention can be used with any of the vehicle doors. The air bag assembly 12 includes an air bag 16 mounted in a storage housing 19 which is, in turn, mounted in the interior of the door assembly 14. Although the air bag assembly 12 is shown as mounted in the door, those skilled in the art will appreciate that the present invention is applicable to any side air bag mounting arrangement including one that mounts the air bag assembly in the door arm rest, vehicle seat, or other location. The invention is also applicable to any deployable bolster or side impact protection device.

A controller 20 is operatively connected to the air bag assembly 12. Specifically, the controller 20 is operatively connected to an electrically actuatable squib 26 in the air bag assembly 12 through a transistor switch 27. The controller 20 is electrically connected to the base of transistor 27. The emitter of transistor 27 is electrically connected to ground. The collector of transistor 27 is connected to one terminal of the squib 26. A second terminal of the squib 26 is connected to the vehicle battery through a diode 29 and to a back-up source of energy in the form of capacitor 31. The controller 20 actuates the squib 26 by turning transistor 27 ON, thereby igniting the squib.

The squib 26 is operatively connected to a source of inflation fluid 28. Ignition of the squib 26 by the controller 20 results in the source of inflation fluid 28 directing inflation fluid into the air bag 16. The inflating air bag 16 opens a cover or deployment door 30 covering the air bag assembly 12. When inflated, the air bag 16 inflates to its operative restraining position shown as 16' in FIG. 1.

Controller 20 is electrically connected to an acceleration sensor assembly 30. Preferably, the acceleration sensor assembly 30 is mounted to the inside trim panel 42 of the door assembly 14 at the lower, rearwardmost quadrant of the door assembly 14.

As shown in FIG. 2, acceleration sensor assembly 30 includes an accelerometer 32. The acceleration sensor assembly has two outputs 34, 36. The output 34 is connected directly to the output of the accelerometer 32. The output 36 is connected to the output of the accelerometer 32 through an amplifier circuit 38. The output 36 is equal to the output 34 times a gain factor established by the amplifier circuit 38. Preferably the gain of amplifier circuit 38 is approximately 25. This arrangement permits use of a single accelerometer for purposes of sensing both a door opening event (using the amplified output 36) and a sideways crash event (using the unamplified output 34). Preferably, the accelerometer 30 is capable of measuring ±500 G's (G's are units of acceleration equal to 32 feet/sec$^2$). The output 36 is referred to as the "low G acceleration" output signal. The output 34 is referred to as the "high G acceleration" output signal.

Those skilled in the art will appreciate that an acceleration sensing assembly can be used in the present invention that includes two separate accelerometers; one high G accelerometer and one low G accelerometer. If two accelerometers are used, it is contemplated that the high G accelerometer would be capable of sensing ±500 G's and that the low G accelerometer would be capable of sensing ±20 G's.

In accordance with a preferred embodiment of the present invention, the accelerometer 32 has an axis of sensitivity 40 (FIG. 1). When the door assembly 14 is closed, the axis 40 is substantially perpendicular to the vehicle's front-to-rear longitudinal axis (not shown). The accelerometer 30 is directional and can sense acceleration having a component in either direction 43, 44 along the axis 40. The accelerometer 30 is relatively insensitive to accelerations in a direction perpendicular to axis 40. Acceleration measured along axis 40 in a direction 43 is defined to be in a negative direction. Similarly, acceleration measured in the direction of arrow 44 is defined to be acceleration in a positive direction. Therefore, opening door 14 results in a negative acceleration signal and a crash event into the vehicle door 14 results in a positive acceleration signal.

The high G acceleration output signal 34 is used by the controller 20 to monitor for large sideways accelerations of the vehicle door as occurs during a sideways crash event. The low G acceleration output signal 36 is used by the controller 20 to monitor for small accelerations of the vehicle door such as those which occur when the vehicle door 14 is opening. It is necessary to amplify the accelerometer output to permit detection of small, low G acceleration values, e.g., ±20 G's, associated with vehicle door 14 opening and closing events.

The controller 20 evaluates the high G output signal 34 and determines whether a given crash event should be classified as a deployment or non-deployment crash event, i.e., a crash event in which the air bag should be deployed or should not be deployed. The air bag is deployed only if the controller 20 determines that a deployment crash event is occurring.

Other events can occur during vehicle operation, such as hitting a pot hole, riding over rough roads, or hitting a curb which cause the accelerometer 32 to produce spurious output signals. Such resultant acceleration signals are referred to herein as "acceleration noise." The controller 20 discriminates between acceleration noise and a deployment crash condition to prevent inadvertent deployment of the air bag in response to acceleration noise.

The controller 20 monitors the output 36, i.e., the low G acceleration output signal, and analyzes the signal to determine whether a door opening event is occurring. Again, the controller filters out acceleration noise from the low G acceleration output signal. When the door 14 is opened, it is initially accelerated in a direction indicated by arrow 43. As those skilled in the art will appreciate, the angle of the acceleration direction of the door 14 relative to the longitudinal axis of the vehicle changes as the door pivots about its mounting axis. Since the axis 40 is fixed relative to the door, however, the acceleration remains parallel to the axis 40.

If the door 14 is swung open in a direction indicated by arrow 43 and hits a stationary barrier 50, such as a stationary pole, a side of a building, a parked car, etc., the sudden stopping of the door 14 by the barrier results in a large positive acceleration component in the direction indicated by arrow 44. This positive acceleration component relative to the door's reference frame results in an output signal from accelerometer 32 at output 34. Depending on the design of the controller 20, it is possible that the positive acceleration component would be of such nature that the controller 20 would misinterpret the event as a deployment crash event and thus trigger energization of the squib 26, resulting in an unnecessary deployment of the air bag.

In accordance with the present invention, the controller 20 determines when a door opening event is occurring and, in response to such an occurrence, either (i) disables deployment of the air bag for a predetermined time period after a door opening event is detected, or (ii) temporarily increases a triggering threshold which must be exceeded before the controller 20 energizes the squib 26.

As mentioned, the accelerometer 32 is preferably capable of measuring ±500 G's and outputs an electrical signal having a value equal to approximately 5 mV/G sensed. A door opening event has been found to exhibit an acceleration in the −1 to −3.5 G's range. Therefore, the resultant acceleration from a door opening event would produce a voltage in the −5 mV to −17.5 mV range from the accelerometer. To better measure the acceleration in this small range, as mentioned, the accelerometer output is amplified by the amplifier 38 (preferably having a gain of 25). The output 36 of amplifier 38 is connected to an input 61 (FIG. 3) of the controller 20.

Referring to FIG. 3, functions performed internal to the controller 20 are schematically shown in functional block diagram form. Preferably, the controller 20 is a microcomputer. For simplicity of explanation and understanding, the operation of the controller is described with reference to the functional block diagram. These functions can also be performed by a microcomputer, in a manner later described herein. Although use of a microcomputer is preferred, it will be understood by those skilled in the art that the functions performed by the controller may be embodied using discrete analog and digital circuitry. Such circuitry would be connected as shown in FIG. 3 and perform the functions shown in FIG. 3.

The amplified output 36 of the accelerometer 32 is compared against a first threshold value 60 by a comparing function 62 of the controller 20. The amplified output 36 of the accelerometer 32 is also compared against a second threshold value 64 by a comparing function 66 of the controller 20. The results of the comparisons 62, 66 are ANDed by ANDing function 70 of the controller 20.

The first threshold value 60 and the second threshold value 64 are used by the controller 20 to determined whether the door 14 is in a door opening event. Since a door opening event results in acceleration in the negative direction, the first and second threshold values 60 and 64 are defined as negative numbers. A door opening event is then defined by the acceleration value being less than the first threshold value 60 and greater than the second value 64.

The first threshold value 60 is empirically determined for a particular vehicle platform on which the system is to be installed. Testing establishes the acceleration levels experienced during driving events that result in acceleration noise. Also, empirically measured test data are used to establish the acceleration levels for an actual door opening event. Testing on one particular vehicle platform has indicated that a typical door opening acceleration is −1.75 G's. Also, testing has indicated that a first threshold level of −1 G provides adequate filtering of acceleration noise. Therefore −1G is used in one embodiment as the first threshold value 60.

The selection of a second threshold value 64 is also empirically determined. An important factor in determining the second threshold value is an acceleration resulting from a crash event into the vehicle on the opposite side from where the restraint system 10 is mounted. For example, assume that the restraint system 10 shown in FIG. 1 is mounted in the driver's door. A collision into the passenger's side of the vehicle results in an acceleration of the vehicle, including the driver's door, in a direction indicated by arrow 43. Since a door opening acceleration is also in the direction of arrow 43, a collision into the passenger's door "looks like" a door opening event in terms of the polarity of the accelerometer output signal. The only difference is the magnitude of acceleration signal. When a collision occurs into the passenger's side of the vehicle, it is not desirable to disable deployment of the driver's door air bag since a secondary collision may occur into the driver's door by another vehicle or by the subject vehicle hitting a barrier with significant force. Empirical testing has found that establishing a second threshold level between −3.5 G's to −5 G's permits a distinction between a true door opening event and a side collision into the opposite side of the vehicle. For the purposes of explanation, −3.5 G's is used as the threshold value. If the sensed acceleration is less than the second threshold value of −3.5 G's, e.g., −6 G's, the control arrangement of present invention does not disable or alter conditions required for deployment. An acceleration value less than −3.5 G's is assumed to be the result of a crash into the opposite side of the vehicle. The actual second threshold value is dependent on the vehicle platform.

From the above discussion, it will be appreciated that the output of the ANDing function 70 is a digital HIGH or TRUE only when the signal output from the accelerometer 32 is indicative of an acceleration between the first threshold value of −1 G and the second threshold value of −3.5 G's. Those skilled in the art will appreciate that what is meant by establishing a threshold value at −1 G and −3.5 G's is to establish voltage values that are indicative of corresponding acceleration values. For example, if the acceleration outputs 5 mv/G, then −5 mv would be equivalent to −1 G and −17.5 mv would be equivalent to −3.5 G's.

The unamplified output 34 of the accelerometer 32 is connected to an input 76 of the controller 20. The controller 20 analyzes the signal output 34 from the accelerometer 32 for the purpose of determining if a deployment crash is occurring on the side of the vehicle associated with the air bag assembly 12. Acceleration resulting from a crash into the side of the vehicle associated with the air bag assembly 12 is in the positive direction 44.

In accordance with a preferred embodiment of the present invention, the controller 20 performs a two part analysis of the acceleration signal 34 to determine if a vehicle crash condition is occurring. The two part analysis includes (i) determining if an average sideways acceleration value 80 in the positive direction 44 is greater than a predetermined average acceleration threshold value 82, and (ii) determining if a sideways velocity value 94 in the positive direction 44 based on the acceleration signal 32 is greater than a final velocity threshold value 84.

In an analog embodiment, the average acceleration function 80 would be realized by a low-pass filter. In a microprocessor embodiment (described hereafter) the function 80 would be realized developing a running sum of the current acceleration value and the five consecutive values immediately preceding the current value. It is contemplated that six to ten samplings would be sufficient to give an adequate average. Six samplings are used for explanation purposes.

The average acceleration value 80 is compared against an average acceleration threshold value 82 using a comparing function 86 of the controller 20. The average acceleration threshold value 82 is empirically determined using the particular vehicle platform of interest. To establish the average acceleration threshold value, a desired vehicle platform is equipped with an accelerometer. A determination of average acceleration is made for both deployment and non-deployment crash conditions. The threshold value 82 is determined from these crash events so that threshold value will be exceeded upon the occurrence of a deployment crash event.

If the average acceleration 80 is greater than the average acceleration threshold value 82, the output of the comparing function 86 is HIGH or true. The output of the comparing function 86 is used as one input of an ANDing function 88 of controller 20.

The controller 20 further determines a velocity value 94 in response to the output 34 of the accelerometer 32. The velocity value is determined by integrating the acceleration signal over time. The determined velocity value is compared against a final velocity threshold value 84 to determined if the air bag should be deployed.

Since the integration is done from the "KEY-ON" condition of the vehicle, i.e., when the vehicle is started, integration of the door acceleration signal would continue to accumulate a velocity value in response to all accelerations of the door each time the door is opened and closed. If the determined velocity value were not returned-to-zero over time, it would be possible to have an accumulation of velocity values that finally total to a value greater than the final velocity threshold value 84 so as to result in air bag deployment for a non-deployment condition. To avoid this type of inadvertent deployment that results from an accumulation of velocity values, the controller 20 includes a return-to-zero function 96. This return-to-zero function 96 subtracts a small fraction of the determined velocity value from the integral value at each sampling of the acceleration signal. This is done to return the velocity value gradually back to zero after the velocity determined from the acceleration of the door, in fact, returns to zero.

The determined velocity value 94 is one input of a comparing function 100 performed by the controller 20. The velocity value 94 is compared against a predetermined velocity threshold value 104 multiplied by a multiplying factor term established through a multiplying factor/timer function 110 using a multiplying function 114. The resultant multiplication provides the final velocity threshold 84 which is the second input of the comparing function 100. The velocity threshold value 104 is empirically determined by mounting an accelerometer to a vehicle of a desired platform, and crashing the vehicle in both deployment and non-deployment crash conditions. The crash velocity values are determined. The velocity threshold value is selected to ensure that the velocity value will exceed the velocity threshold value during a deployment crash condition.

During a non-door opening event, i.e., one in which the value of the acceleration signal does not fall between the −1 G to −3.5 G window, the multiplying factor is set equal to one so that the determined velocity value 94 is compared against the predetermined velocity threshold 104. The output of the comparing function 100 provides a second input for the ANDing function 88. When the determined velocity value 94 is greater than the velocity threshold value 104 during a non-door opening event, the output of the comparing function is HIGH or TRUE.

When both the determined average acceleration 80 is greater than the average acceleration threshold 82 and the determined velocity value 94 is greater than the velocity threshold value 104 times the multiplying factor 110, i.e., the final velocity threshold value 84, the output of the ANDing function 88 is HIGH or TRUE. The output of the ANDing function 88 of the controller 20 is connected to the base of transistor switch 27 as discussed above. When transistor 27 is turned ON by a HIGH or TRUE from the output of the ANDing function 88, the squib 26 is energized, resulting in deployment of the air bag 16.

The output of the ANDing function 70 of the controller 20, which is indicative of whether the door is in a door opening event, is connected to a time delay function 130. This time delay function is schematically shown as an RC network including resistor 132 and capacitor 134. The RC junction, i.e., the output of the time delay function 130, is connected to the input of a multiplying factor/timer function 110 of the controller 20.

When the monitored acceleration signal at terminal 36 (the low G acceleration output) is at a value indicative of an acceleration value between the first threshold value 60 and the second threshold value 64 for a time period greater than a predetermined time period controlled by the time constant of the time delay function 130, the multiplying factor/timer circuit 110 will increase the multiplying factor. Increasing the multiplying factor from a value of one to a higher value (for example, four) raises the final velocity threshold value 84 used in the comparing function 100 for a predetermined time period (for example, two seconds). The value of the multiplying factor and time period raised threshold continues are empirically determined for each of the various vehicle platforms of interest.

The purpose of the time delay function 130 is to prevent a door opening indication (output of ANDing function 70 going HIGH) from triggering the multiplying factor/timer function 110 when, in fact, a collision into the opposite side of the vehicle has occurred. As those skilled in the art will appreciate, a collision into the opposite side of the vehicle that results in a negative acceleration of less than −3.5 G's, e.g., −6 G's, must necessarily pass through the range of −1 G to −3.5 G's as it moves toward its ultimate value. As the acceleration value passes through the range defined by the threshold values 60, 64, the output of the ANDing function 70 goes HIGH or TRUE. The time delay function 130 begins to time out or run when the output of the ANDing function 70 goes HIGH. Only if the output of the ANDing function 70 remains HIGH for a predetermined time period does the multiplying factor/timing function 110 get triggered. If the time delay function 130 were not present, the multiplying factor/timing function 110 would be actuated upon the occurrence of a collision into the vehicle's opposite side. The actual value of the time delay function 130 is empirically determined, but may, for example, be 75 msec.

As stated previously, in its preferred form, controller 20 will be a program-controlled, microcomputer controller. As is conventional, the microcomputer controller will include a central processing unit, appropriate registers and/or scratch pad memory, read-only memory ("ROM") for program storage, analog-to-digital converters for converting incoming analog signals into a digital format, programmable timers, interrupt controllers, and so on. All of these elements and their interconnections are well known in the art, and are consequently not illustrated herein.

Figure 4:
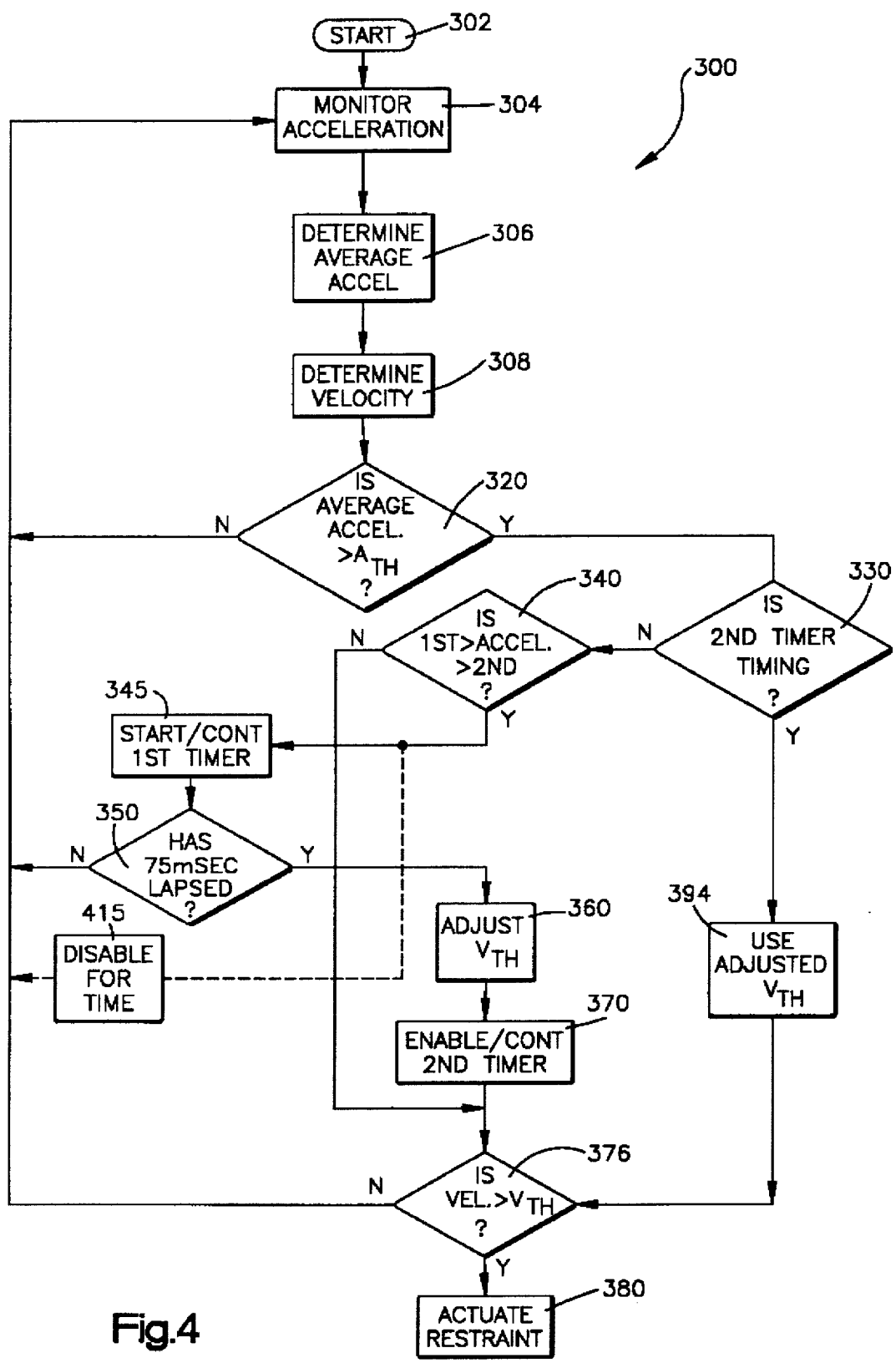
FIG. 4 is a flow chart showing a control process embodiment for the controller shown in FIG. 1.

Referring to FIG. 4, a control process 300 followed by a microcomputer embodiment of controller 20 is shown in flow chart form. The process 300 includes an initialization step 302 in which internal memories of the controller are reset, counters set to initial values, and internal timers are reset, as is well known in the art. In step 304, the output of the accelerometer 32, including both the high G acceleration output signal 34 and the low G acceleration output signal 36, is sampled. The average acceleration value 80 is determined in step 306.

The average acceleration value 80 is determined by summing a predetermined number of sampled acceleration values from output 34 over time. The acceleration signal 34 is sampled at predetermined times. By summing a predetermined number of sampled acceleration values, e.g., six, an average acceleration value is produced over the time period needed to make the six acceleration samplings. It is contemplated that six to ten samplings would be sufficient to give an adequate acceleration average. For the purpose of discussion, six samplings are used.

In a preferred embodiment, the average acceleration value 80 is continuously updated by subtracting out the oldest acceleration value, from six samplings earlier, and summing in the newest sampled acceleration value. This process requires that six acceleration values be stored in a memory within the average acceleration determining function 80. An internal program pointer starts at a first memory location of function block 80 and loads the first sampled acceleration value into the first memory location. After the first acceleration value is stored, the pointer advances to a second memory location. The next sampled value is loaded into the second memory location. After six acceleration values are stored, the pointer returns to the first memory location. To update the average acceleration value, the acceleration value stored in memory at the present pointer location is subtracted from the total. The new acceleration value is stored and also summed to establish a new average acceleration value. Those skilled in the art will appreciate that the average acceleration value developed at block 80 is determined over a sliding time window having a time period equal to that necessary to perform six acceleration samplings.

The process then proceeds to step 308 where the velocity value 94 is determined. In accordance with a preferred embodiment of the present invention, the crash velocity value 94 is determined by integrating the acceleration signal over time. If the acceleration value is equal to A, the velocity value 94, designated as V, can be expressed as follows:

$$V = -A \, dt$$

The controller 20 further performs a return-to-zero process 96 to return the velocity value 94 back to zero. This return-to-zero process 96 is performed on the velocity value V each time a new acceleration value is sampled in step 304 and velocity value determined in step 308. The return-to-zero process can be expressed as:

$$V_{new} = V_{old} - \frac{V_{old} + 128}{256}$$

After the value of $V_{old}$ is less than or equal to 128, the return to zero routine is switched to:

$$V_{new} = V_{old} - 1$$

The process, in step 320, determines whether the average acceleration value A determined in step 306 is greater than the average acceleration threshold value 82 designated as $A_{TH}$. If the determination in step 320 is negative, the process returns to step 304 where the next acceleration value is sampled. If the determination in step 320 is affirmative, the process proceeds to step 330 where a determination is made as to whether the timer of the multiplying factor/timer function 110 (referred to as the second timer) is running. The first time through the loop, the determination in step 330 is negative. From a negative determination in step 330, the process branches to step 340 where a determination is made as to whether the acceleration value 36 from the low G acceleration output signal 36 is between the first acceleration threshold value 60 and the second acceleration threshold value 64. The purpose of step 340 is to determine if a door opening event is occurring.

If an acceleration value is present at output 36 but is between zero and the first threshold value 60 (which, it will be recalled, is a negative number), the acceleration is considered to be the result of acceleration noise and not the result of a door opening event. Acceleration values less than or equal to the second threshold value 64 (i.e., more negative than the second threshold value) are considered to be the result of a collision into the side of the vehicle opposite the subject sensor. When the acceleration value is between the first threshold value 60 and the second threshold value 64, the acceleration is considered to be the result of a door opening event. As mentioned above, the values of first and second thresholds 60, 64 are empirically determined for each vehicle platform.

If the determination in step 340 is affirmative, i.e., a door opening event may be occurring, the controller 20 proceeds to step 345 where the time delay function 130 (referred to as the first timer) is started or permitted to continue running. The process then proceeds to step 350 where a determination is made as to whether the first timer has reached 75 msec. If the determination is negative, as it would be the first time through the loop, the process returns to step 304. If the determination in step 350 is affirmative, then a door opening event is, in fact, occurring and the controller 20 adjusts the value of a velocity threshold value 104 in step 360 by multiplying the velocity threshold value 104 by a predetermined value. This is accomplished by enabling the multiplying factor/timer function 110 in step 370. When enabled, the timer in step 370 times out a predetermined time period, e.g., 2 seconds. A determination is made in step 376 as to whether the velocity value determined in step 308 is greater that a threshold value 84 $V_{TH}$.

During a non-door opening event, the velocity value is compared against the velocity threshold value $V_{TH}$ 104. During a door opening event, however, steps 360, 370 serve to adjust the value of the velocity threshold by raising the value for a predetermined time period. It is contemplated that the velocity threshold value would be multiplied by a value of four. The increased threshold would continue for a short interval, perhaps two seconds, adequate to permit completion of the door opening event.

If the determination in step 376 is negative, the process loops back to step 304 where the next acceleration value is sampled, processed and loaded. If the determination in step 376 is affirmative, i.e., both the average acceleration is greater than its threshold value $A_{TH}$ and the velocity value is greater than the final threshold value $V_{TH}$, the process proceeds to step 380 where the restraint is actuated.

If the determination in step 340 is negative, i.e., the event is not a door opening event, the process proceeds to step 376. In this situation, the velocity threshold $V_{TH}$ used in the determination of step 376 is the threshold value 104 times a value of one.

If the determination in step 330 is affirmative, i.e., the timer was enabled in step 370 because a door opening event was detected, but the time started in step 370 has not completed timing out, the controller 20 proceeds to step 394 where the adjusted threshold value (step 360) is used for the determination in step 376. Therefore, those skilled in the art should appreciate that once a door opening event is detected, the adjusted velocity threshold value is used in the velocity comparison for the time period timed out by the timer started in step 370. If the velocity value does exceed the adjusted threshold value as determined in step 376 during a door opening event, the restraint is actuated.

Figure 3A:
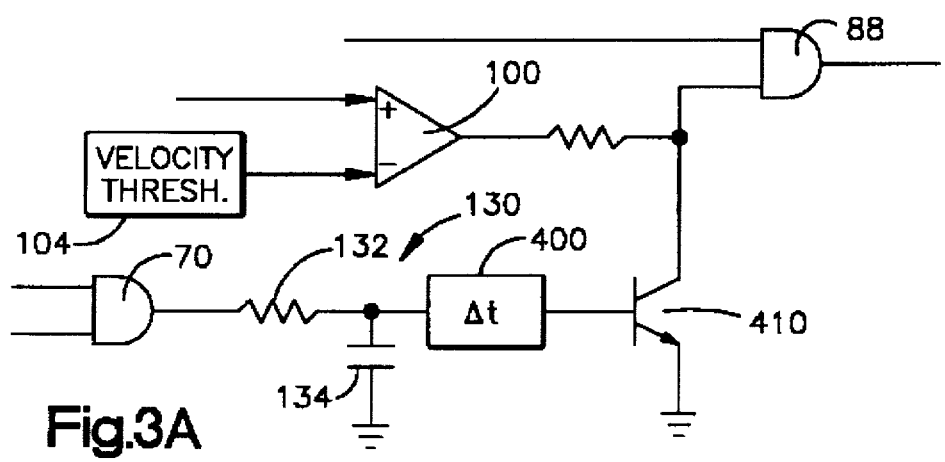
FIGS. 3A–3F are schematic block diagrams illustrating alternative embodiments of the present invention.

FIG. 3A is a modification of part of the FIG. 3 diagram, and shows an alternative embodiment of the present invention. In accordance with this embodiment, the output of the timing delay function circuit 130 is connected to a disable timer function 400 instead of multiplying factor/timer function 110. The comparing function 100 compares the velocity 94 against the velocity threshold value 104 which is a fixed value. When enabled, the timer function 400 times out a predetermined disable time period. The output of the disable timer function 400 is connected to a switching transistor 410. The transistor 410 is connected between one input of ANDing function 88 and ground. The output of comparator function 100 is connected to the input of ANDing function 88 through a resistor. When the timing function 400 is timing out, the one input of the ANDing function 88 is pulled LOW thereby preventing deployment of the air bag 16 instead of raising the threshold value.

It is to understood that the disable function is accomplished internal to the controller 20 when the controller 20 is a microcomputer. Referring to FIG. 4, an affirmative determination in step 340, for this alternative disable embodiment shown in FIG. 3A, proceeds to step 415 where the restraint system is disabled for a predetermined time period controlled by timer function 400. After the time period has timed out, the process proceeds to step 304. Actuation of the restraint device is prevented until the disable time period has timed out.

Figure 3C:
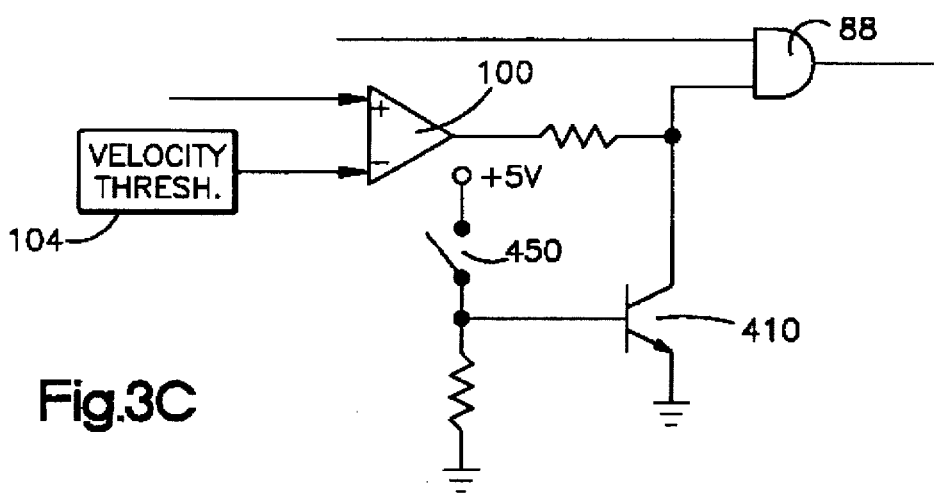
Figure 3D:
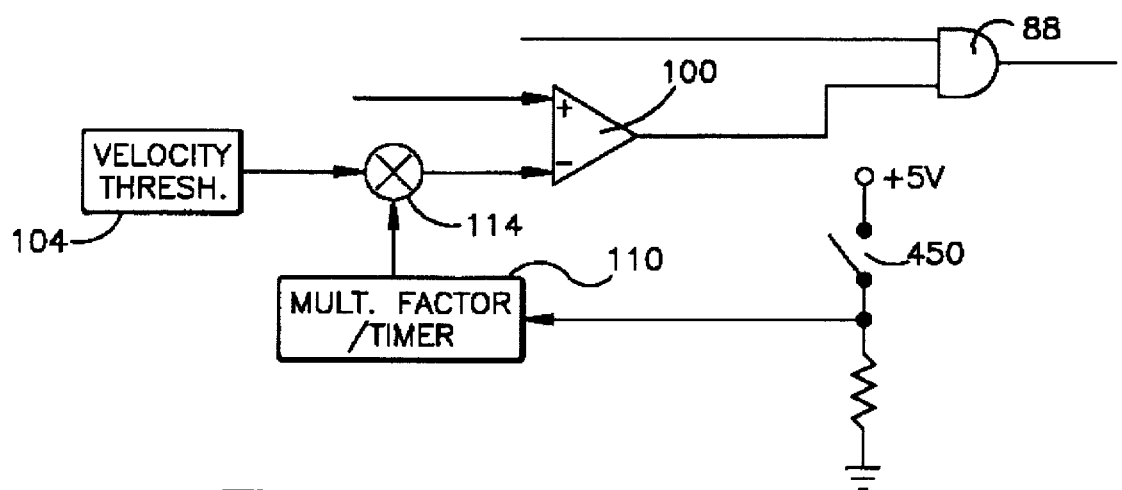
Figure 3B:
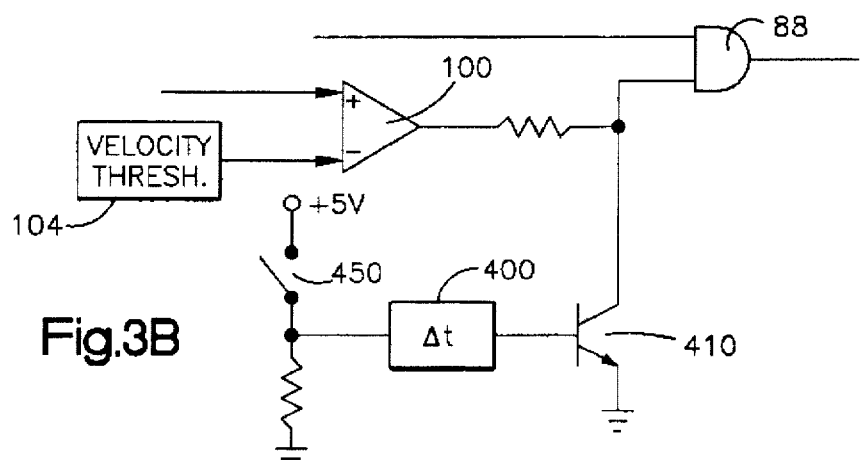

Referring to FIG. 3B, which is another modified version of part of the FIG. 3 diagram, another alternative embodiment includes a door switch 450 operatively connected between a source of electrical energy equivalent to a digital HIGH and the disable timing function 400. The switch 450 is a normally closed switch, that is, open only when the associated door 14 is closed. When the door 14 opens, the switch 450 closes. When switch 450 is closed, it applies a digital HIGH to the input of the disable timer 400 which begins to time out its predetermined disable time period. As described above, when the disable timer 400 is timing out, the one input of the ANDing function 88 is pulled LOW. Therefore, whenever the door 10 is opened, the restraint system is disabled for a time period. Alternatively, door opening may be sensed using a door latch switch.

In accordance with yet another embodiment shown in FIG. 3C, the door switch 450 is connected directly to switch 410. When the switch 450 is closed by the door being open, the one input of the ANDing function 88 is pulled LOW to disable the restraint system.

Referring to FIG. 3D, still yet another alternative embodiment includes the door switch 450 operatively connected between a source of electrical energy equivalent to a digital HIGH and the multiplying factor/timer function 110. The switch 450 is, again, a normally closed switch, that is, in an open condition only when the associated door 10 is closed. When the door 10 opens, the switch 450 closes and applies a digital HIGH to the input of the multiplying factor/timer 110, which results in the velocity threshold value 104 being multiplied by the predetermined multiplying factor as described above. This raises the velocity threshold value used in comparison 100, for the predetermined time period, by the multiplying factor/timer circuit 110 whenever the door 10 is opened.

Figure 5A:
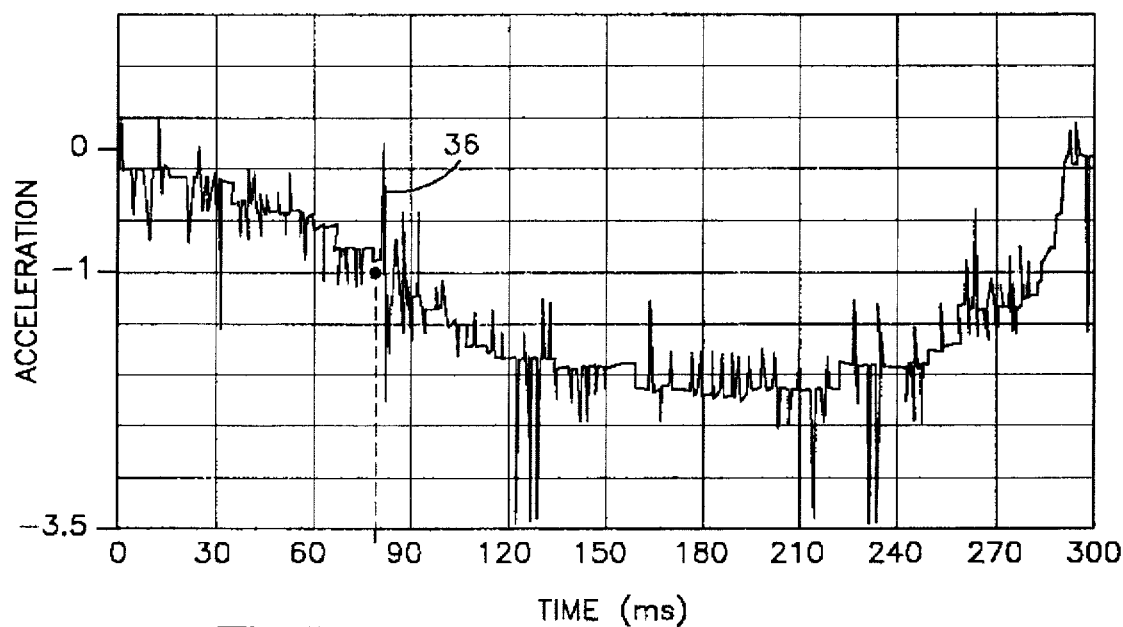
FIGS. 5A and 5B are graphs of the output of the accelerometer shown in FIG. 1 as a function of time when the door is opened into a stationary barrier.
Figure 5B:
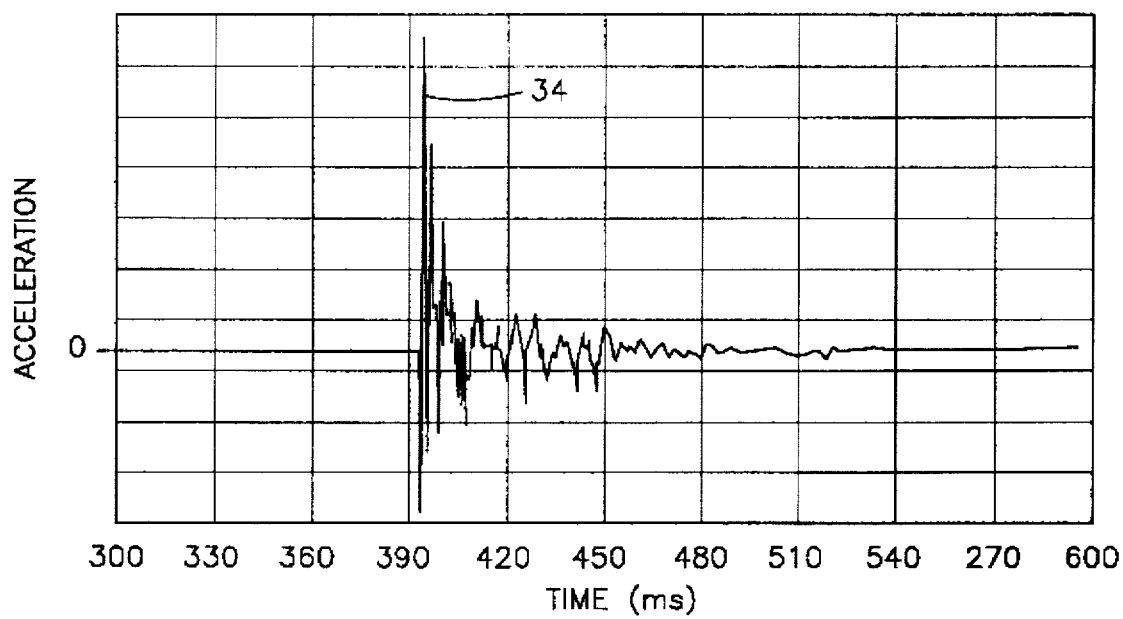
Figure 6:
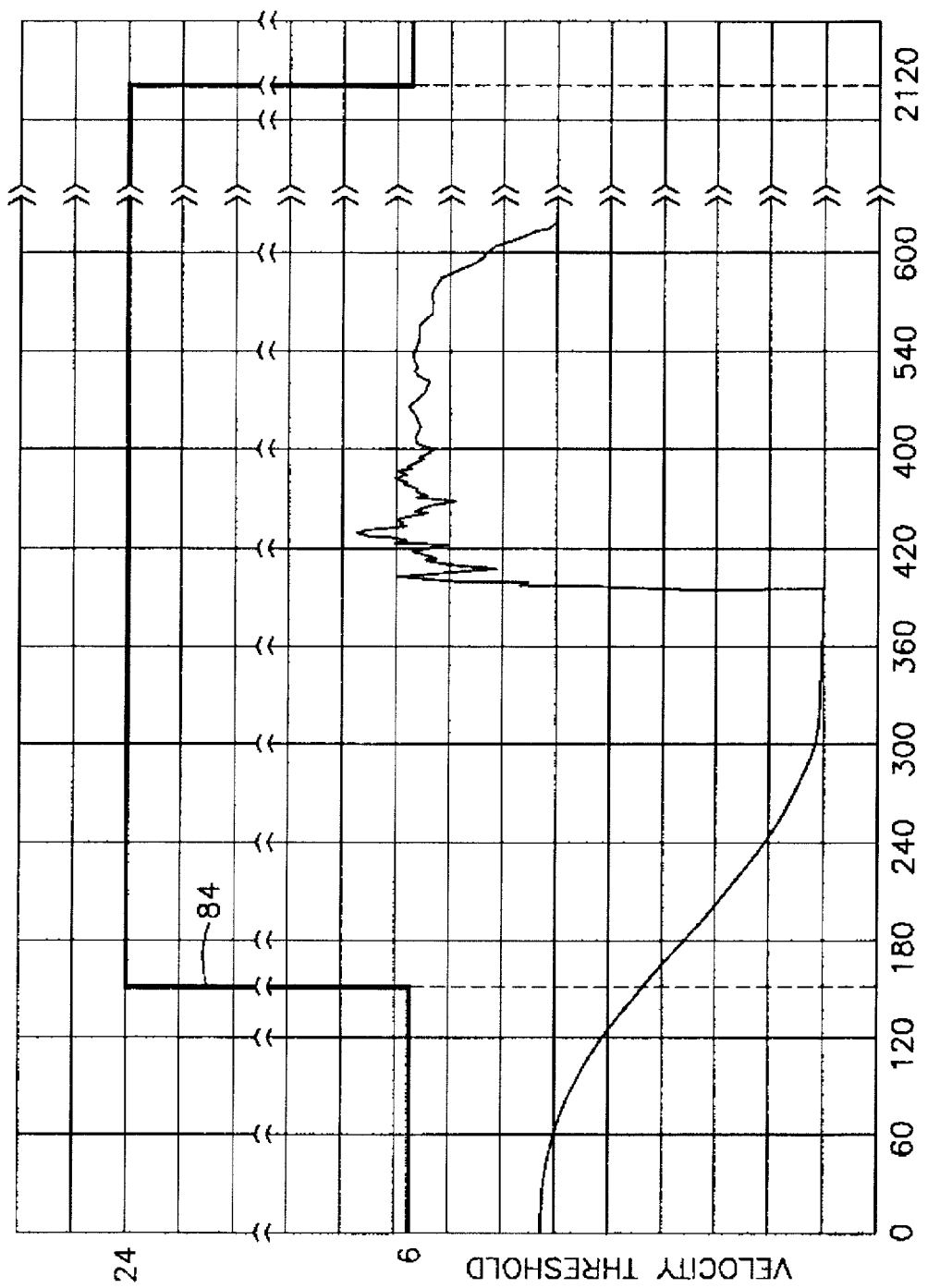
FIG. 6 is a graph of door velocity determined from the acceleration graphs of FIGS. 5A and 5B as a function of time.

Referring to FIGS. 5A and 5B, the accelerometer output signal 36 and the accelerometer output signal 34, respectively, are shown with respect to time for a door opening event. FIG. 6 shows the determined velocity value 94 over time. The amplitude scale of FIG. 5B is approximately 150 times the scale factor of FIG. 5A. At time zero, door opening first starts. At approximately 80 msec. into the door opening event (FIG. 5A), the acceleration value becomes less than the first threshold value 60 of −1 G. After the 75 msec. delay provided by the time delay function 130 (at approximately 155 msec into the door opening event), the predetermined velocity threshold value 104 of 6 feet/sec is adjusted by multiplying the value by four (FIG. 6). Note that the multiplying factor/timer function 110 is triggered at the 155 msec point in time because the acceleration value was still within the −1 G to −3.5 G window. This multiplication, i.e., adjusted threshold, continues for the next two seconds and maintains the increased threshold value until time 2155 msec. after the door opening event began. At approximately 400 msec. into the door opening event, the door strikes a rigid barrier resulting in a substantial acceleration into the door (FIG. 5B), i.e., in the positive direction.

Referring to FIG. 6, the determined velocity value from this barrier hit is shown. When the door hits the barrier, the velocity value exceeds the velocity threshold value 104 of 6 feet/sec. If the velocity threshold value were directly connected to one input of the comparator 100, the output of comparator 100 would switch to a HIGH. By switching to a HIGH, it is possible to inadvertently deploy the air bag which would occur if the average acceleration value 80 were also above its associated threshold value 82 at such time. However, such inadvertent deployment is prevented by adjusting the threshold value at the 155 msec. point in time. Therefore, the present system will prevent an inadvertent bag deployment as the result of the door being opened into a barrier. Those skilled in the art will appreciate that the described alternative methods of disabling the deployment circuit will also prevent the inadvertent deployment of the air bag.

Referring to FIGS. 3, 3E, 7, and 8, another embodiment of the present invention determines door opening based upon door acceleration and velocity. Referring to FIG. 3E which, again, is a modification of part of FIG. 3, the controller 20 monitors the low G acceleration signal 36 and determines, in function block 500, whether the acceleration value is within a predetermined acceleration window as described above. The controller 20 further determines the velocity, in function block 502, from the low G sensor output and also determines whether the velocity value is within a predetermined velocity window. The window comparators in blocks 500 and 502 are similar, but have different thresholds. If the acceleration value from the low G sensor is within the acceleration window, the output of the acceleration function block 500 is a digital HIGH or TRUE. If the velocity value determined from the low G acceleration output 36 is within the velocity window, the output of the velocity function block 502 is a digital HIGH or TRUE.

The outputs of the acceleration function block 500 and the velocity function block 502 are ANDed by ANDing function 510. When both the determined acceleration and determined velocity are within their respective windows, the output of the ANDing function 510 will be a digital HIGH or TRUE thereby triggering a time delay function 520. The time delay function 520 works in a similar fashion as the time delay function 130 described above. In this embodiment, the time delay function is approximately 40 msec. Therefore, if the acceleration and velocity remain within their windows for a period of 40 msec, the output of the time delay function 520 will become a digital HIGH or TRUE. The output of the time delay function 520 is connected to the multiplying factor/timer function 110.

Figure 3E:
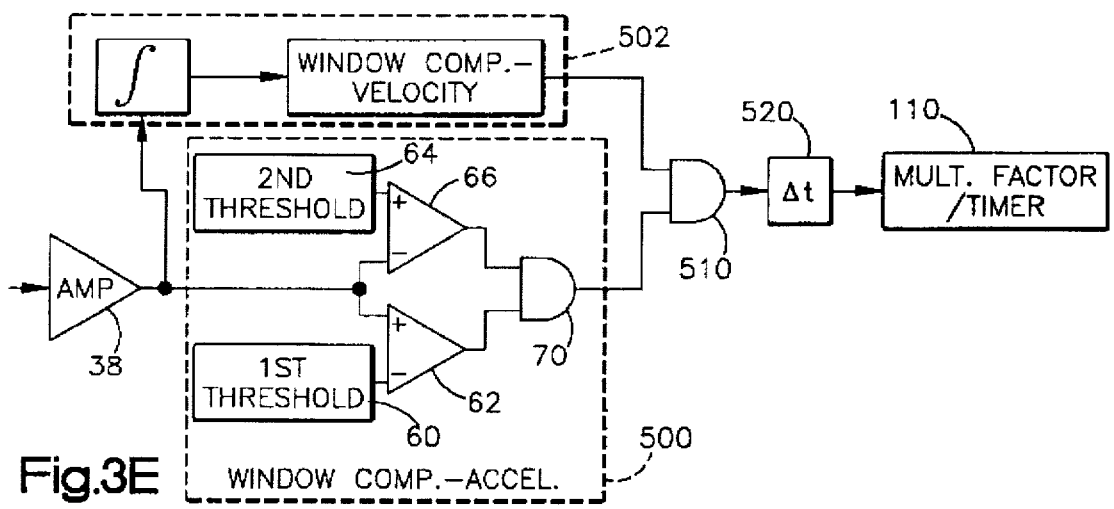
Figure 3F:
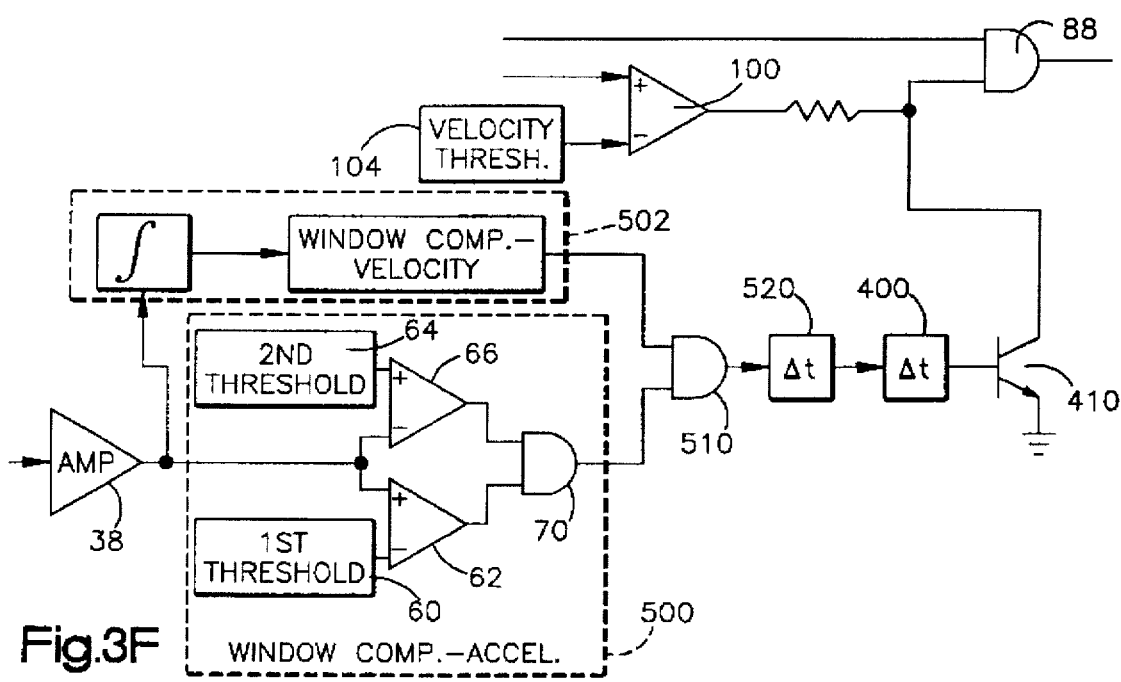

In accordance with yet another embodiment of the present invention shown in FIG. 3F, the output of time delay function 520 is connected to disable timer 400. The disable timer 400 controls transistor 410 as described above with regard to other embodiments.

Once the output of the time delay function 520 goes to a digital HIGH or TRUE condition, it triggers either the multiplying factor/timer function 110 (FIG. 3E) or the disable timer 400 (FIG. 3F) in a manner as described above, thereby preventing an inadvertent deployment of the air bag upon a door opening event into a barrier.

Figure 7:
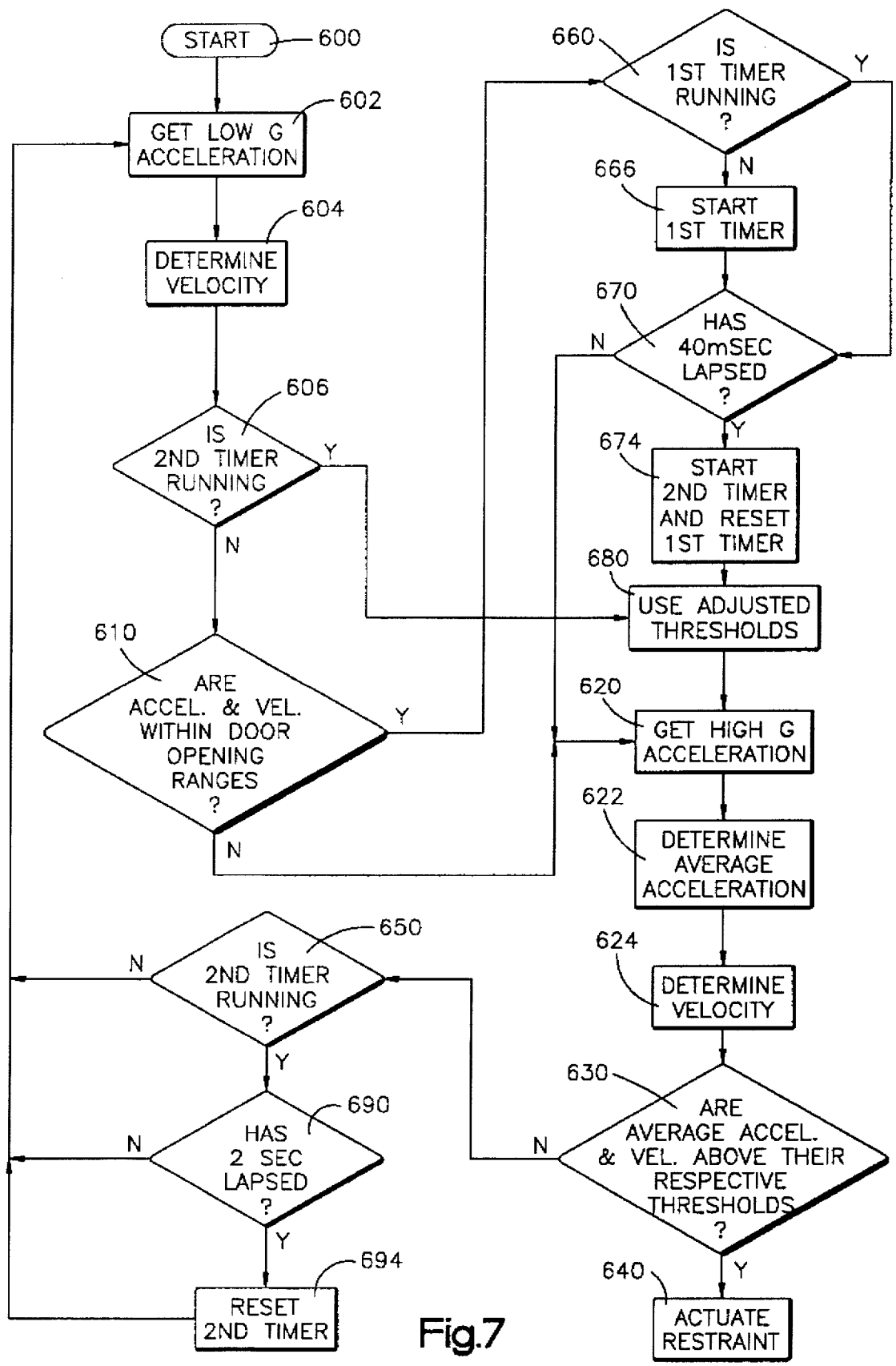
FIG. 7 is a flow chart showing another control process embodiment for the controller of FIG. 1.

Referring to FIG. 7, the details of the control process for a microcomputer implementation of the embodiments shown in FIGS. 3E and 3F including functional steps corresponding to elements 500, 502, 510, and 520 will be better appreciated. In step 600, the controller 20 is initialized in a manner described above and well known in the art. In step 602, the controller 20 reads the low G output 36 of the accelerometer 32. The process proceeds to step 604 where the controller 20 determines an updated velocity value from the low G acceleration output 36. In step 606 a determination is made as to whether the second timer is running. The second timer is the timer in the multiplying factor/timer function 110 (FIG. 3E) or, alternatively, the timer in the disable timer function 400 (FIG. 3F). The first time through the control process, the determination in step 606 is negative. The process then proceeds to step 610 where a determination is made as to whether the acceleration value and the velocity value are within door opening ranges. As described above, the acceleration ranges are between −1 G and −3.5 G. The velocity ranges are between −3 feet/second and −6 feet/second.

If the determination in step 610 is negative, i.e., the door 10 is not in a door opening event, the process proceeds to step 620 where the controller 20 monitors the high G output 34. In step 622, the controller 20 determines the average acceleration value 80 in the manner described above. In step 624, the controller determines the velocity value 94 in a manner as described above. The process then proceeds to step 630 where a determination is made as to whether the average acceleration value 80 and the velocity value 94 are greater than their respective thresholds. If the determination in step 630 is affirmative, the air bag is actuated in step 640. If the determination in step 630 is negative, the process proceeds to step 650 where a determination is made as to whether the second timer, i.e., the timer in multiplying factor/timer function 110 or the timer in disable timer function 400, is running. If the determination in step 650 is negative, the process loops back to step 602.

If the determination in step 610 is affirmative, i.e., the door is in a door opening event, the process proceeds to step 660 where a determination is made as to whether or not the first timer is running. The first timer referred to in step 660 is the time delay function 520. The first time through the loop, the determination in step 660 is negative. The process proceeds to step 666 where the first timer 520 is started. From either step 666 or an affirmative determination in step 660, the process proceeds to step 670 where a determination is made as to whether or not 40 msec has lapsed or has been timed out by the time delay function 520. Step 670 and the time delay function 520 provide the filtering to ensure that a true door opening event is occurring. Once timer 520 times out, it is automatically reset. As described above, this filtering prevents disabling of or the altering of requirements to deploy the air bag when a collision to the opposite side of the vehicle occurs.

If the determination in step 670 is negative, the process proceeds to step 620. If the determination in step 670 is affirmative, the process proceeds to step 674 where the second timer in the multiplying factor/timer function 110 is started or, alternatively, the timer in the disable timer function 400 is started. In step 674, the first timer is reset. From either step 674 or an affirmative determination in step 606, the process proceeds to step 680 where the controller uses the adjusted velocity threshold value in its comparing function 100 by multiplying the velocity threshold value 104 times the multiplying factor from the multiplying factor/timer function 110. (Of course, in the embodiment using the disable timer function 400, step 680 would be eliminated and the process would proceed from step 674 to step 650.) From step 680, the process proceeds to step 620 and continues as described above.

If the second timer is timing out, the determination in step 650 is affirmative and the process proceeds to step 690 where a determination is made as to whether or not two seconds has lapsed. If the determination in step 690 is affirmative, i.e., two seconds has elapsed, the process proceeds to step 694 where the second timer is reset. From either a negative determination in step 690 or from step 694, the process loops back to step 602.

From the above it will be appreciated that, in accordance with this embodiment, door opening is determined as a function of both determined acceleration and velocity from the low G output 36 of the accelerometer 32. If the output from the time delay function 520 is connected to the multiplying factor/timer function 110, the velocity threshold value is raised. If the output of the time delay function 520 is connected to the timer 400, actuation of the air bag is completely disabled as described above.

Figure 8:
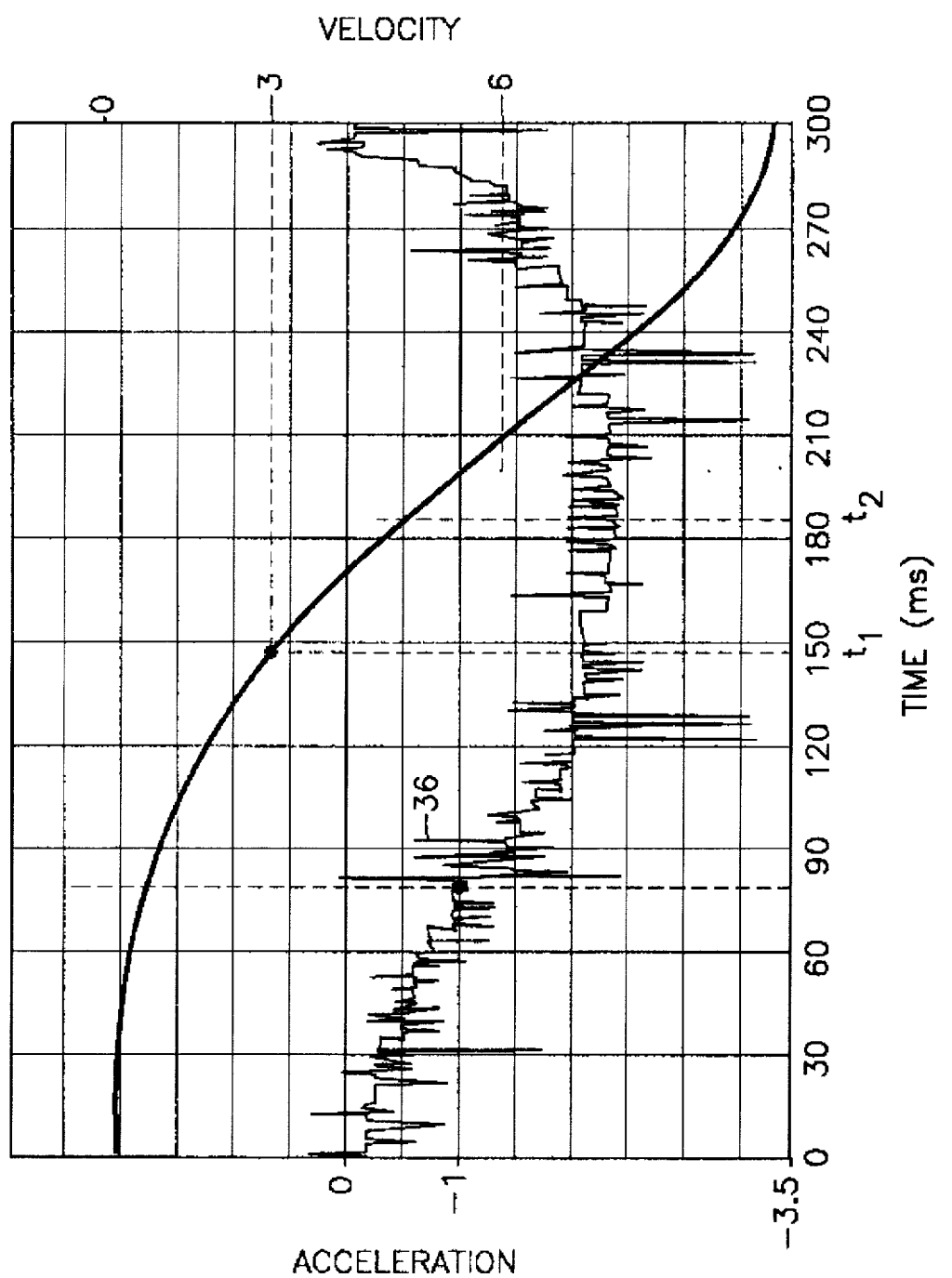
FIG. 8 is a graph of door acceleration and velocity during a door opening condition.

Referring to FIG. 8, the low G output 36 of the accelerometer 32 is plotted over time and represents the same door opening event as shown in FIG. 5A. Also, shown in FIG. 8 is the determined velocity that occurred in function block 502 of FIGS. 3E and 3F in step 604 of the flow chart of FIG. 7. As can be seen from the graph of FIG. 8, the acceleration 36 becomes less than −1 G at approximately 80 msec after the door opening event began. However, at the 80 msec point in time, the velocity has not yet fallen within the velocity window of −3 feet/second to −6 feet/second. At approximately time $t_1$ into the door opening event, the determined velocity value falls within the −3 feet/second to the −6 feet/second window. At this point in time, the determination in step 610 is affirmative, which results in the first timer 520 being started in step 666. Since both the acceleration value 500 and the determined velocity value 502 remain within their associated windows for the entire 40 msec period for which the timer of time delay function 520 is timing, the controller adjusts the threshold values or, alternatively, disables deployment of the air bag at time $t_2$. The velocity threshold values would remain adjusted or the deployment remain disabled for two seconds starting from time $t_2$.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for controlling actuation of an occupant restraint, comprising:

acceleration sensing means mounted in a door of a vehicle for sensing a sideways acceleration of the door and for providing a signal indicative thereof;

door opening sensing means for sensing an opening event of the vehicle door and providing a signal indicative thereof; and control means operatively connected to said acceleration sensing means, to said door opening sensing means, and to the occupant restraint for determining sideways velocity of the vehicle in response to said output signal from said acceleration sensing means and for actuating the occupant restraint when said sideways velocity is greater than a predetermined threshold value and for adjusting the value of said predetermined threshold value when said door opening sensing means indicates a vehicle door opening event.

2. The apparatus of claim 1 wherein said control means includes timing means for providing a timing signal having a predetermined time period when said signal from said door opening sensing means first indicates said door opening event, said control means adjusting said predetermined threshold value for said time period of said timing signal when said timing signal is provided.

3. The apparatus of claim 2 wherein said door opening sensing means includes a door switch operatively mounted between said door and the vehicle for providing a signal indicative of said door opening event.

4. The apparatus of claim 1 wherein said door opening sensing means is connected to said acceleration sensing means and wherein said door opening sensing means includes means for sensing when said signal from said acceleration sensing means is between first and second predetermined acceleration threshold values, said first and second predetermined acceleration threshold values defining a range of acceleration values indicative of said door opening event, said door opening sensing means providing said signal indicative of said door opening event when said sensed acceleration is between said first and said second predetermined acceleration threshold values.

5. An apparatus for controlling actuation of a vehicle safety restraint, comprising:

restraining means for restraining occupant movement during a vehicle crash condition;

crash sensing means for providing a signal indicative of a vehicle crash condition and providing a signal indicative of an opening vehicle door;

actuating means for actuating said restraining means;

control means for controlling said actuating means to thereby actuate said restraining means when said signal from said crash sensing means is indicative of a vehicle crash condition; and disabling means for disabling said actuating means to prevent inadvertent actuation of said restraining means when said signal from said crash sensing means is indicative of an opening vehicle door.

6. A method for controlling actuation of an occupant restraint in a vehicle, comprising:

mounting an accelerometer to a door of the vehicle;

sensing a sideways acceleration of the vehicle in response to an output signal from said accelerometer and providing a signal indicative thereof;

sensing opening of a vehicle door in response to an output signal from said accelerometer and providing a signal indicative thereof; and actuating the occupant restraint when said output signal from said accelerometer is indicative of a sideways crash condition and when said vehicle door is not sensed as being open.

7. The method of claim 6 further including the step of preventing actuation of the occupant restraint when the door is sensed as opening.

8. The method of claim 7 further including providing a timing signal having a predetermined time period when door opening is first sensed, said step of preventing said actuation of the occupant restraint continues for said time period.

9. The method of claim 6 wherein said step of sensing door opening includes sensing when said acceleration signal is between first and second predetermined acceleration threshold values, said first and second predetermined threshold values defining between them a range of acceleration values indicative of door opening, said step of sensing a door opening provides said signal indicative of door opening only when said sensed acceleration is between said first and said second predetermined acceleration threshold values.

10. A method for controlling actuation of an occupant restraint of a vehicle comprising the steps of:

sensing a sideways acceleration of the vehicle and providing a signal indicative thereof;

sensing opening of a vehicle door and providing a signal indicative thereof;

determining sideways velocity of the vehicle in response to said output signal from said sensed sideways acceleration;

actuating the occupant restraint when said sideways velocity is greater than a predetermined threshold value; and adjusting the value of said predetermined threshold value when said signal is provided indicative of said vehicle door opening.

11. The method of claim 10 further including the steps of providing a timing signal having a predetermined time period when said signal from said step of sensing opening of a vehicle door first indicates that said vehicle door is opening, and wherein said step of adjusting occurs for said time period of said timing signal when said timing signal is provided.

12. The method of claim 10 wherein said step of sensing said vehicle door opening includes sensing acceleration of the door and determining if the sensed acceleration is between first and second predetermined threshold values, said first and second predetermined threshold values defining between them a range of acceleration values indicative of said vehicle door opening, and providing said signal indicative of said vehicle door opening when said sensed acceleration is between said first and said second predetermined threshold values.

13. A method for controlling actuation of an occupant restraint in a vehicle, comprising:

sensing sideways acceleration of the vehicle and providing a signal indicative thereof;

sensing opening of a vehicle door and providing a signal indicative thereof;

determining (i) an average acceleration value of the vehicle door and (ii) sideways velocity of the vehicle door in response to said output signal from said sensed sideways acceleration;

actuating the occupant restraint when both said average acceleration value and said sideways velocity are greater than first and second predetermined threshold values, respectively; and adjusting the value of said second predetermined threshold value when said step of sensing door opening indicates vehicle door opening is occurring.

14. The method of claim 13 further including the step of providing a timing signal having a predetermined time period when said signal from said door opening sensing step indicates that said vehicle door is first opened, and preventing actuation of the occupant restraint for said time period of said timing signal when said timing signal is provided.

15. The method of claim 13 wherein said step of sensing door opening includes sensing when said signal from said sensed sideways acceleration is between first and second predetermined threshold values, said first and second predetermined threshold values defining between them a range of acceleration values indicative of said vehicle door opening, said step of sensing door opening includes providing said signal indicative of said vehicle door opening when said sensed acceleration is between said first and said second predetermined threshold values.

16. A method for controlling actuation of a vehicle safety restraint comprising the steps of:

providing a restraining means for restraining occupant movement during a vehicle crash condition;

providing an acceleration signal indicative of a vehicle crash condition;

and an opening of a vehicle door;

actuating said restraining means when said acceleration signal is indicative of a vehicle crash condition; and disabling said restraining means when said acceleration signal is indicative of opening of the vehicle door.

17. An apparatus for preventing actuation of an occupant restraint, comprising:

sensing means for sensing opening of a vehicle door and providing a signal indicative thereof; and control means operatively connected to said sensing means and to the occupant restraint for preventing actuation of the occupant restraint when said signal from said sensing means indicates the vehicle door is opening, said control means including timing means for providing a timing signal having a predetermined time period when said signal from said sensing means first indicates that said vehicle door is opening, said control means preventing said actuation of the occupant restraint for said time period of said timing signal.

18. An apparatus for preventing actuation of an occupant restraint, comprising:

sensing means for sensing opening of a vehicle door and providing a signal indicative thereof, said sensing means including an accelerometer mounted in said door for providing a signal indicative of the acceleration of the door during opening of said door; and control means operatively connected to said sensing means and to the occupant restraint for preventing actuation of the occupant restraint when said signal from said sensing means indicates the vehicle door is opening.

19. The apparatus of claim 18 wherein said control means includes means for sensing when said signal from said accelerometer is between first and second predetermined threshold values, said first and second predetermined threshold values defining a range of acceleration values of an opening door.

20. The apparatus of claim 18 wherein said control means includes means for determining velocity from said accelerometer signal and means for determining when (i) door acceleration is between associated acceleration limits and (ii) door velocity is between associated velocity limits, said occupant restraint being prevented from actuation only when both door acceleration and door velocity are between their associated limits.

21. An apparatus for controlling actuation of an occupant restraint, comprising:

acceleration sensing means mounted in a door of a vehicle for sensing a sideways acceleration of the vehicle and for providing a signal indicative thereof;

door open sensing means for sensing an open vehicle door and providing a signal indicative thereof;

control means operatively connected to said acceleration sensing means, to said door open sensing means, and to the occupant restraint for actuating the occupant restraint when said sideways acceleration is indicative of a sideways crash condition and no door open condition is sensed; and wherein said door open sensing means is connected to said acceleration sensing means and indicates a door open condition when said acceleration signal indicates said door is accelerating at a value between predetermined acceleration threshold values, said control means preventing actuation of said occupant restraint if said door open condition is indicated.

22. The apparatus of claim 21 wherein said door open sensing means includes means for determining door velocity from door acceleration and further indicates said door open condition only when both door acceleration is at a value between said predetermined acceleration threshold values and when door velocity is between predetermined velocity threshold values.

23. The apparatus of claim 22 wherein said control means includes timing means for providing a timing signal having a predetermined time period when said signal from said door open sensing means indicates that said vehicle door is open, said control means preventing said actuation of the occupant restraint for said time period of said timing signal.

24. The apparatus of claim 21 wherein said control means includes means for determining an average acceleration value from said acceleration signal and means for determining a velocity value from said acceleration signal, said actuation being controlled in response to said average acceleration value and said velocity value.

25. An apparatus for controlling actuation of an occupant restraint, comprising:

acceleration sensing means mounted in a door of a vehicle for sensing a sideways acceleration of the vehicle and for providing a signal indicative thereof;

door opening sensing means for sensing opening of a vehicle door and providing a signal upon the occurrence of a door opening event; and control means operatively connected to said acceleration sensing means, to said door opening sensing means, and to the occupant restraint for determining (i) an average acceleration value of the vehicle door and (ii) sideways velocity of the vehicle door in response to said output signal from said acceleration sensing means and actuating the occupant restraint when both said average acceleration value and said sideways velocity are greater than first and second predetermined threshold values, respectively, and when the acceleration signal is not the result of a door opening event, wherein said control means further includes means for adjusting said second predetermined threshold value when said door opening sensing means indicates said door opening event is occurring.

26. The apparatus of claim 25 wherein said control means further includes timing means for providing a timing signal having a predetermined time period when said signal from said door opening sensing means indicates said door opening event is occurring, said control means adjusting said second threshold value for said time period of said timing signal when said timing signal is provided.

27. The apparatus of claim 25 wherein said door opening sensing means is connected to said acceleration sensing means and wherein said door opening sensing means includes means for sensing when said signal from said acceleration sensing means is between first and second predetermined acceleration threshold values, said first and second predetermined acceleration threshold values defining a range of acceleration values indicative of said door opening event, said door opening sensing means providing said signal indicative of said door opening event when said sensed acceleration is between said first and said second predetermined acceleration threshold values.

28. The apparatus of claim 27 wherein said door opening sensing means further includes means for determining door velocity from said acceleration signal and said means for providing a signal indicative of said door opening event does so only when both acceleration is between said first and second predetermined acceleration threshold values and door velocity is between first and second predetermined velocity threshold values.

29. The apparatus of claim 25 wherein said door opening sensing means includes a door switch operatively mounted between said door and the vehicle for providing a signal indicative of a door opening event.

30. A method for preventing inadvertent actuation of an occupant restraint comprising the steps of:

sensing opening of a vehicle door and providing a signal indicative thereof;

preventing actuation of the occupant restraint when said signal from said sensing means indicates the vehicle door is open; and providing a timing signal having a predetermined time period when said step of sensing first indicates the vehicle door is open, said step of preventing occurring for said time period of said timing signal.

31. A method for preventing inadvertent actuation of an occupant restraint comprising the steps of:

sensing opening of a vehicle door and providing a signal indicative thereof;

preventing actuation of the occupant restraint when said signal from said sensing means indicates the vehicle door is open; and wherein said step of sensing includes sensing acceleration of the door during opening of said door.

32. The method of claim 31 wherein said step of sensing acceleration includes determining if acceleration is between first and second predetermined acceleration threshold values, said first and second predetermined acceleration threshold values defining between them a range of acceleration values indicative of a door opening event.

33. The method of claim 31 wherein said step of sensing opening of the door further includes determining velocity of the door and determining if said sensed acceleration and sensed velocity are within associated limits.

* * * * *

UNITED STATES PATENT AND TRADEMARK OFFICE
CERTIFICATE OF CORRECTION

PATENT NO. : 5,538,099
DATED : July 23, 1996
INVENTOR(S) : Brian K. Blackburn, Scott B. Gentry, Joseph F. Mazur, Naushad Hossian and James McCuskey It is certified that error appears in the above-indentified patent and that said Letters Patent is hereby corrected as shown below:

Column 17, line 52, after "condition" delete --;--.

Signed and Sealed this

Tenth Day of December, 1996

Attest:

BRUCE LEHMAN

*Attesting Officer*          *Commissioner of Patents and Trademarks*